United States Patent [19]

Kersting

[11] Patent Number: 4,613,170
[45] Date of Patent: Sep. 23, 1986

[54] ADAPTOR FOR CONNECTING TUBULAR MEMBERS IN AN EXHAUST SYSTEM

[75] Inventor: Darrel Kersting, Black River Falls, Wis.

[73] Assignee: Nelson Industries, Inc., Stoughton, Wis.

[21] Appl. No.: 684,093

[22] Filed: Dec. 20, 1984

[51] Int. Cl.$^4$ ............................................. F16L 55/00
[52] U.S. Cl. .................................. 285/187; 285/233; 285/397
[58] Field of Search ............... 285/397, 398, 233, 370, 285/109, 187, 9.2

[56] References Cited

U.S. PATENT DOCUMENTS

| Re. 24,509 | 1/1959  | Smith ............................ 285/187 |
| 1,627,044  | 5/1927  | McGeehin . |
| 1,738,021  | 12/1929 | Shipley ......................... 285/374 X |
| 1,811,277  | 6/1931  | Mosley ......................... 285/398 X |
| 2,207,518  | 7/1940  | Moser ........................... 285/109 |
| 2,242,604  | 5/1941  | Wells ............................ 285/92 |
| 2,323,823  | 7/1943  | Markey ........................ 285/397 X |
| 2,326,292  | 8/1943  | Dorman .................... 285/DIG. 22 X |
| 2,437,385  | 3/1948  | Halford ....................... 285/370 X |
| 2,489,587  | 11/1949 | Rice ............................. 285/370 X |
| 2,685,460  | 8/1954  | Ogborn et al. .............. 285/348 X |
| 2,773,710  | 12/1956 | Smith ........................... 285/187 |
| 2,922,663  | 1/1960  | Wolf ............................. 285/9 |
| 3,173,710  | 3/1965  | Kinnison ...................... 285/9.2 |
| 4,054,306  | 10/1977 | Sadoff, Jr. et al. .......... 285/233 |

FOREIGN PATENT DOCUMENTS

| 51029   | 12/1935 | Denmark ............... 285/397 |
| 988197  | 8/1951  | France .................. 285/397 |
| 599493  | 5/1978  | Switzerland .......... 285/370 |
| 1444078 | 7/1976  | United Kingdom ... 285/237 |
| 2083154 | 3/1982  | United Kingdom ... 285/397 |

Primary Examiner—Thomas F. Callaghan
Attorney, Agent, or Firm—Andrus, Sceales, Starke & Sawall

[57] ABSTRACT

An adaptor for connecting tubular members in an exhaust system. The adaptor comprises a tube having opposite ends that are curled outwardly in a generally circular configuration. The curled ends of the adaptor are press fitted within the ends of the tubular members of the exhaust system and each curled end is disposed adjacent an internal shoulder in the respective tubular member. Exhaust gases passing through the adaptor will heat the adaptor causing it to expand axially to bring the curled ends into firm contact with the respective shoulders, and the outer surfaces of the curled ends will flatten against the walls of the respective tubular members to provide a tight seal between the adaptor and the tubular members.

1 Claim, 4 Drawing Figures

ADAPTOR FOR CONNECTING TUBULAR MEMBERS IN AN EXHAUST SYSTEM

BACKGROUND OF THE INVENTION

In the past, machined tubular metal castings have been used to connect the exhaust pipe of a muffler with the outlet of a turbocharger. The machined casting has a relatively thin wall, and the ends of the casting are provided with circumferential flanges which are adapted to engage the inner walls of the muffler exhaust pipe and the turbocharger outlet pipe, respectively.

As the connector has a relatively thin wall, it is difficult to maintain the outer diameter of the flanges within precise tolerances and due to the required machining, the connector is extremely expensive to manufacture.

SUMMARY OF THE INVENTION

The invention is directed to a simple and inexpensive adaptor for connecting two tubular members in an exhaust system, such as an exhaust pipe and the outlet of a turbocharger. As utilized in that application, a ring is secured to the downstream end of the exhaust pipe and defines an inwardly extending ledge or abutment. The outlet member on the turbocharger has a similar internal shoulder or ledge.

In accordance with the invention, the ends of the adaptor are rolled or curled outwardly in a generally circular cross section. The rolled ends of the adaptor are press fitted into the ends of the exhaust pipe and the turbocharger outlet, respectively, with the rolled ends being positioned adjacent the respective internal shoulders or ledges.

During usage, the exhaust gases passing through the adaptor will heat the adaptor, causing the adaptor to expand axially, and bringing the rolled ends into firm engagement with the respective shoulders in the exhaust pipe and turbocharger outlet. Heating of the adaptor will also cause the rolled ends to flatten out against the internal walls of the intake and exhaust pipe, thereby providing a tight seal between the members without the use of gaskets, O-rings, or other sealing members.

The invention provides an inexpensive construction for obtaining a positive seal between the tubular members of an exhaust system.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
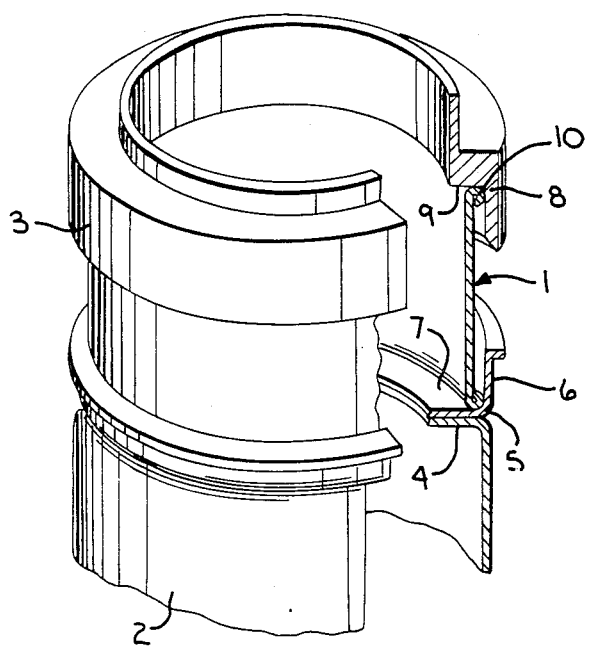
FIG. 1 is a perspective view of the adaptor of the invention as used to connect the exhaust pipe of a muffler and the outlet of a turbocharger, with parts broken away.
Figure 3:
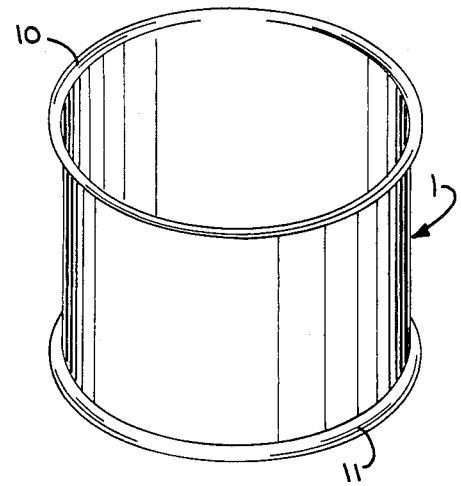
FIG. 3 is a perspective view of the adaptor.
Figure 2:
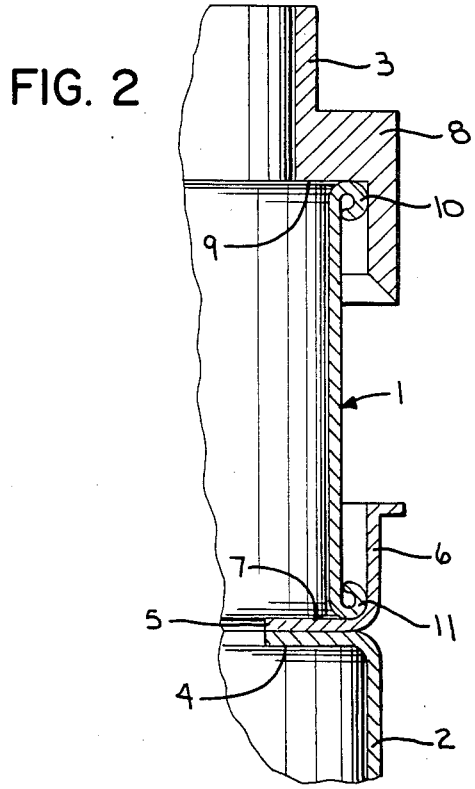
FIG. 2 is a longitudinal section showing the adaptor assembled with the exhaust pipe and turbocharger outlet.

FIGS. 1-3 illustrate an adaptor 1 utilized to connect an exhaust pipe 2 of a muffler with the outlet pipe 3 of a turbocharger.

Exhaust pipe 2, which is connected to a muffler for an internal combustion engine, is provided with an inwardly extending flange 4 and the horizontal leg 5 of ring 6 is secured by welding to flange 4. As best shown in FIG. 1, the upper end of ring 6 is bent outwardly to form a flange and the central portion of the ring defines an internal shoulder or ledge 7.

The upstream end of the outlet pipe 3 of the turbocharger is formed with an outwardly extending flange 8 which defines a shoulder or ledge 9 that is opposed to the shoulder 7 on exhaust pipe 2.

As shown in FIG. 3, adaptor 1 is in the form of a tube fabricated from rolled and seam welded steel. The ends of the adaptor are rolled or curled outwardly to form a generally circular curl at each end, indicated by 10 and 11. The curled ends 10 and 11 are formed by a die press operation to hold the outer diameter of the curls to a precise tolerance.

Curled end 10 is press fitted within the upstream end of outlet pipe 3, with the curled end 10 being in proximate relation to the shoulder 9. Similarly, the curled end 11 is pressed fitted within the downstream end of exhaust pipe 2, with the curled end being positioned in proximate relation to the shoulder 7.

The curled ends 10 and 11 provide increased stiffness or rigidity for the adaptor so that the adaptor will provide a rigid connection between the pipes 2 and 3.

During use, the hot exhaust gases passing through adaptor 1 will cause the adaptor to expand axially to bring the outer extremities of the curled ends 10 and 11 into tight bearing engagement with the respective shoulders 9 and 7. In addition, heat expansion of the adaptor will cause the curled ends to flatten slightly against the inner wall of flange 8 of pipe 3 and against the inner wall of ring 6. This construction insures a positive seal between the two pipes 2 and 3 without the necessity of auxiliary gaskets, O-rings, or other type of sealing mechanism.

Figure 4:
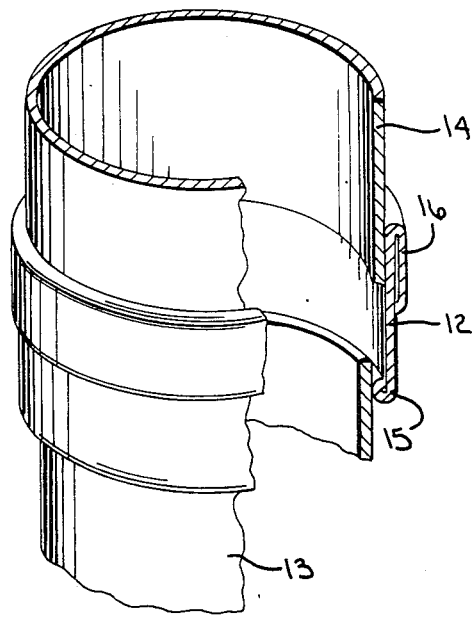
FIG. 4 is a perspective view, with parts broken away, showing a modified form of the invention.

FIG. 4 illustrates a modified form of the invention, in which an adaptor 12, similar to adaptor 1 of the first embodiment, is designed to connect tubular members 13 and 14 of two different diameters. The smaller diameter tubular member 13, which can be an exhaust pipe, is press fitted within one end of the adaptor 12 which has an inwardly extending curl 15.

The opposite end of adaptor 12 is provided with an elongated outwardly curled end 16 and the end of tube 14 is press fitted within the end 16.

The invention provides an inexpensive adaptor that achieves a rigid, positive seal between tubular members in an exhaust system.

While the drawings have illustrated the adaptor as having a uniform diameter through its length, it is contemplated that in some installations the adaptor, or a portion of the length of the adaptor, may be tapered in which case one end will have a larger diameter than the other end.

Various modes of carrying out the invention are contemplated as being within the scope of the following claims particulary pointing out and distinctly claiming the subject matter which is regarded as the invention.

I claim:

1. In an exhaust system for conducting an exhaust gas, a first tubular member, a first end of said first tubular member having a first axial opening of substantially constant diameter, an internal shoulder spaced from said first end of said first tubular member and having a smaller diameter than said first axial opening, a second tubular member, an end of said second tubular member having a second axial opening of substantially constant diameter, a second internal shoulder spaced from said end of the second tubular member and having a smaller diameter than said second opening, said openings being disposed in alignment, and a rigid metallic tubular adaptor connecting the aligned ends of said tubular members, the ends of said adaptor having reverse bends to provide outwardly curled ends freely disposed within the respective axial openings in said tubular members, the outer axial extremity of each curled end being seated against the respective shoulder and the outer radial extremity of each curled end being engaged with the wall of the respective tubular member bordering the opening therein, said adaptor providing a rigid sealed connection between said tubular members without auxiliary sealing members.

* * * * *